W. H. BROWN.
METHOD OF MAKING LUBRICATING SPRING EYES.
APPLICATION FILED APR. 6, 1917.
1,253,464. Patented Jan. 15, 1918.
Fig. 1.
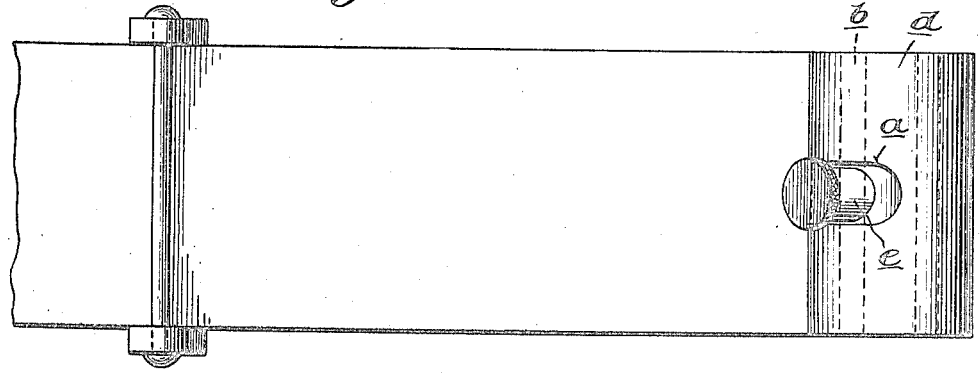
Fig. 2.
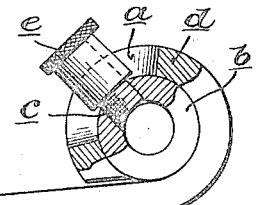
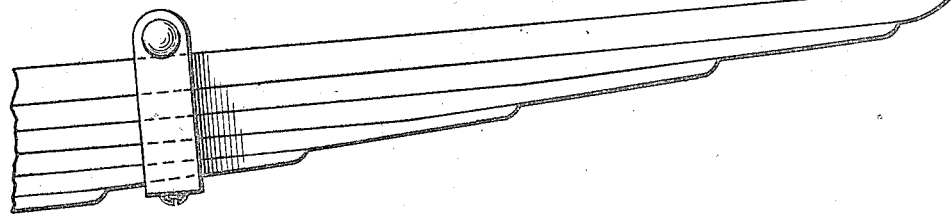
Fig. 3. 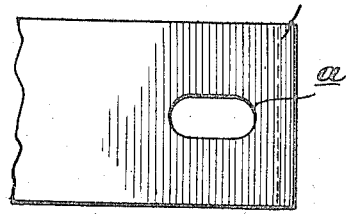   Fig. 4. 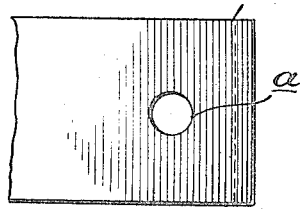   Fig. 5. 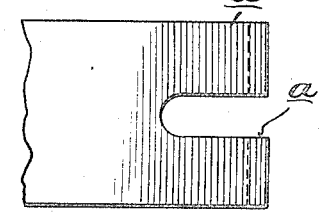
Fig. 6.
Witness
Chas. L. Griesbauer
Inventor
Will H. Brown
By Davis & Davis
Attorneys

UNITED STATES PATENT OFFICE.

WILLIAM HIRAM BROWN, OF CLEVELAND, OHIO.

METHOD OF MAKING LUBRICATING SPRING-EYES.

1,253,464.      Specification of Letters Patent.      Patented Jan. 15, 1918.

Application filed April 6, 1917. Serial No. 160,260.

*To all whom it may concern:*

Be it known that I, WILLIAM H. BROWN, a citizen of the United States of America, and a resident of Cleveland, county of Cuyahoga, State of Ohio, have invented certain new and useful Improvements in Methods of Making Lubricating Spring-Eyes, of which the following is a full and clear specification.

This invention has relation to a method of fabricating the main leaf of a leaf-spring so as to provide for economically oiling the end bushing that is usually mounted in the curled end of the spring. The usual method now provided for oiling the pivot bolt bearing in the bushing is to provide a shackle bolt having a grease cup on one end, the bolt or pivot of the shackle being bored out longitudinally as well as crosswise. This is an expensive way of providing for oiling the bushing, and, besides, the grease hole (which is at right angles to the longitudinal bore in the bolt) quickly becomes clogged and thus results in defective lubrication of the bolt. In a few instances, another method is to drill and tap the eye formed on the end of the spring, but this is very expensive because of the fact that the metal is spring steel and therefore hard to drill and tap without spoiling many drills and breaking many taps; this method is objectionable also because it requires a special operation of annealing the eye and afterward suitable retempering the same.

In the drawing—

Figure 1 is a plan view of one end of a leaf spring constructed in accordance with my method;

Fig. 2 is a side elevation thereof, partly in section;

Figs. 3, 4 and 5 are detail plan views showing three styles of opening, any one of which may employ and carry out my method; and Fig. 6 is a detail longitudinal section through the form shown in Fig. 3.

As distinguished from the foregoing methods, my method of fabrication consists of punching an opening $a$ near the end of the plate before it is shaped and tempered. The bushing $b$, previously tapped at $c$, is then pressed or forced endwisely into the usual eye $d$ previously formed in the end of the spring by curling the end thereof, the bushing being so positioned that its tapped oil $c$ will be coincident with the opening $a$ in the eye $d$. After the bushing is thus pressed into position, any suitable cup or nipple $e$ may be screwed into the opening $c$, thereby locking the bushing in place and providing a means for applying oil to the usual pivot bolt which works in the bushing. The opening $a$ may be circular, as shown in Fig. 4, a closed slot, as shown in Fig. 3, or an open-ended slot, as shown in Fig. 5.

It will be observed that the resultant device is simple and efficient, and it will also be observed that my method of constructing and assembling the device renders it exceedingly inexpensive to manufacture.

It will be observed that the oil cup or nipple $e$ serves simply as a closure for the oil hole $c$ in the bushing, and that, therefore, any other closure device may be employed without departing from the spirit of my invention; in fact, it would be possible to carry out my invention without employing any cup or other closure device if it were not that some such device is needed to keep the dirt out of the hole $c$. It will be observed also that this closure device is not needed to prevent endwise movement of the bushing in the eye, as that is provided against by a tight fit between the bushing and the eye.

The nature and scope of the invention having been thus indicated and its preferred embodiment having been specifically described, what is claimed as new is:

1. The method herein described of making lubricating eyes for leaf-springs, consisting in forming an opening at the end of the main plate of the spring, then shaping and tempering the plate and forming an eye at its end by curling the end of the plate where it is provided with said opening, then inserting a bushing into said eye, said bushing having been previously provided with a screw-threaded hole, which hole is brought to a point coincident with the aforesaid opening in the eye of the plate, and then passing the end of a cup or nipple through said opening in the eye of the spring and screwing it into the hole in the bushing.

2. As an article of manufacture, a leaf-spring having its main leaf curled at one end to form an eye, said eye being provided with an opening formed at a point between the ends of the eye, a bushing extending through said eye and provided with an opening coincident with the opening in the eye, and an oiling nipple extending through the opening in the eye and fastened in the hole in the bushing.

3. The method herein described of making lubricating eyes for leaf-springs, consisting in forming an opening at the end of the main plate of the spring, then shaping and tempering the plate and forming an eye at its end by curling the end of the plate where it is provided with said opening, then tightly inserting a bushing into said eye, said bushing having been previously provided with an oil hole, which hole is brought to a point coincident with the aforesaid opening in the eye of the plate.

4. As an article of manufacture, a leaf-spring having its main leaf curled at one end to form an eye, said eye being provided with an opening formed at a point between the ends of the eye, a bushing extending through said eye and provided with an opening coincident with the opening in the eye, and a closure device for said opening in the bushing.

In testimony whereof I hereunto affix my signature.

WILLIAM HIRAM BROWN.

Copies of this patent may be obtained for five cents each, by addressing the "Commissioner of Patents, Washington, D. C."